(12) United States Patent
Kodama et al.

(10) Patent No.: US 8,947,735 B2
(45) Date of Patent: Feb. 3, 2015

(54) IMAGE PROCESSING APPARATUS AND IMAGE PROCESSING METHOD FOR PERFORMING ERROR DIFFUSION PROCESSING FOR EACH REGION OF AN IMAGE

(75) Inventors: Shigeo Kodama, Tokyo (JP); Hisashi Ishikawa, Urayasu (JP)

(73) Assignee: Canon Kabushiki Kaisha, Tokyo (JP)

(*) Notice: Subject to any disclaimer, the term of this patent is extended or adjusted under 35 U.S.C. 154(b) by 670 days.

(21) Appl. No.: 13/208,716

(22) Filed: Aug. 12, 2011

(65) Prior Publication Data

US 2012/0050815 A1 Mar. 1, 2012

(30) Foreign Application Priority Data

Aug. 25, 2010 (JP) ................................. 2010-188756
Jun. 28, 2011 (JP) ................................. 2011-143392

(51) Int. Cl.
*G06K 15/00* (2006.01)
*H04N 1/405* (2006.01)

(52) U.S. Cl.
CPC .................................. *H04N 1/4052* (2013.01)
USPC ........................................................ 358/3.03

(58) Field of Classification Search
CPC ...... H04N 1/52; H04N 1/4052; H04N 1/4053
See application file for complete search history.

(56) References Cited

U.S. PATENT DOCUMENTS

| | | | |
|---|---|---|---|
| 5,621,545 A | 4/1997 | Motta | |
| 5,739,917 A | 4/1998 | Shu | |
| 5,748,785 A | 5/1998 | Mantell | |
| 6,175,424 B1 | 1/2001 | Iino | |
| 6,282,325 B1* | 8/2001 | Han | ............................. 382/270 |
| 6,330,075 B1 | 12/2001 | Ishikawa | |

(Continued)

FOREIGN PATENT DOCUMENTS

| | | |
|---|---|---|
| CN | 1230844 | 10/1999 |
| CN | 1906923 | 1/2007 |

(Continued)

OTHER PUBLICATIONS

European Search Report dated Dec. 16, 2011, issued during prosecution of related European application No. 11178315.5.

(Continued)

*Primary Examiner* — Benny Q Tieu
*Assistant Examiner* — Sunil Chacko
(74) *Attorney, Agent, or Firm* — Fitzpatrick, Cella, Harper & Scinto

(57) ABSTRACT

When the pixel of interest exists at a pixel position where reference of an error buffer is necessary, a quantization error generated in a region having undergone error diffusion processing is obtained from the error buffer. A quantization error generated in error diffusion processing in a region containing the pixel of interest is obtained from an error memory. Diffusion errors are calculated from the quantization errors using an error diffusion matrix. The value of the pixel of interest and the diffusion errors are added, and the addition value is quantized into the quantization value of the pixel of interest. The difference between the quantization value and the addition value is calculated as a quantization error to be stored in the error memory. When the pixel of interest exists at a pixel position where write in the error buffer is necessary, the quantization error is stored in the error buffer.

14 Claims, 14 Drawing Sheets

(56) References Cited

U.S. PATENT DOCUMENTS

| | | |
|---|---|---|
| 6,967,745 B1 | 11/2005 | Konno |
| 7,669,953 B2 | 3/2010 | Kakutani |
| 7,940,427 B2 | 5/2011 | Takemura |
| 8,009,327 B2 | 8/2011 | Ishikawa |
| 8,482,792 B2 | 7/2013 | Yanai |
| 2001/0028466 A1 | 10/2001 | Kobayashi |
| 2004/0010633 A1 | 1/2004 | Ishikawa |
| 2007/0058202 A1 | 3/2007 | Kakutani |
| 2008/0137145 A1* | 6/2008 | Takemura et al. ........... 358/3.03 |
| 2009/0059303 A1 | 3/2009 | Miyazaki |
| 2009/0310161 A1 | 12/2009 | Kawamura |
| 2010/0141972 A1 | 6/2010 | Yanai |
| 2011/0164829 A1 | 7/2011 | Moribe |

FOREIGN PATENT DOCUMENTS

| | | |
|---|---|---|
| CN | 101052091 | 10/2007 |
| CN | 101150736 | 3/2008 |
| EP | 0 889 642 | 1/1999 |
| EP | 2 214 395 | 8/2010 |
| JP | 63-309458 | 12/1988 |
| JP | 63-310269 | 12/1988 |
| JP | 6-91606 | 11/1994 |
| JP | 8-228285 | 9/1996 |
| JP | 9-135351 | 5/1997 |
| JP | 3004628 | 11/1999 |
| JP | 3733826 | 10/2005 |

OTHER PUBLICATIONS

Chinese Office Action dated Sep. 4, 2013, issued during prosecution of related Chinese application No. 201110249581.9. (Whole English-language translation included).

Japanese Office Action dated Jul. 14, 2014 issued in Japanese Patent Application 2010-188747, which is a foreign counterpart of related U.S. Appl. No. 13/188,221.

* cited by examiner

F I G. 1
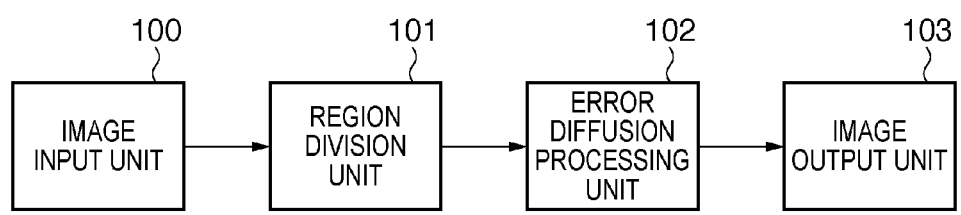

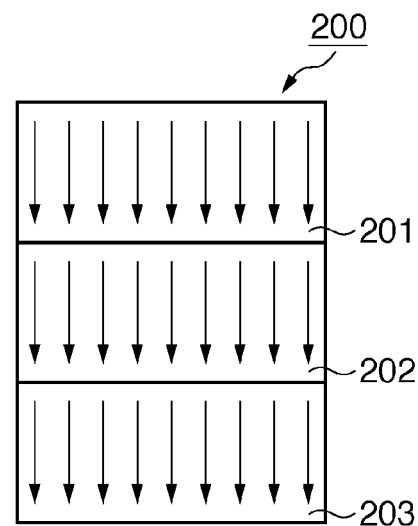
F I G. 2A
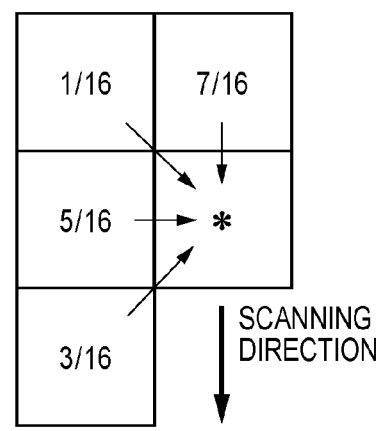
F I G. 2B
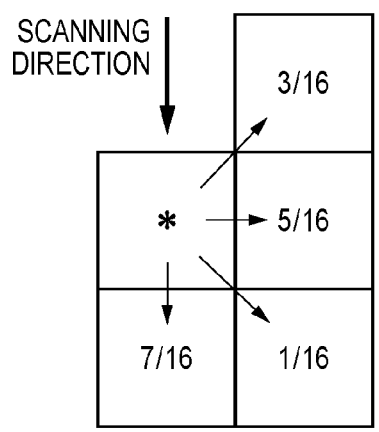
F I G. 2C

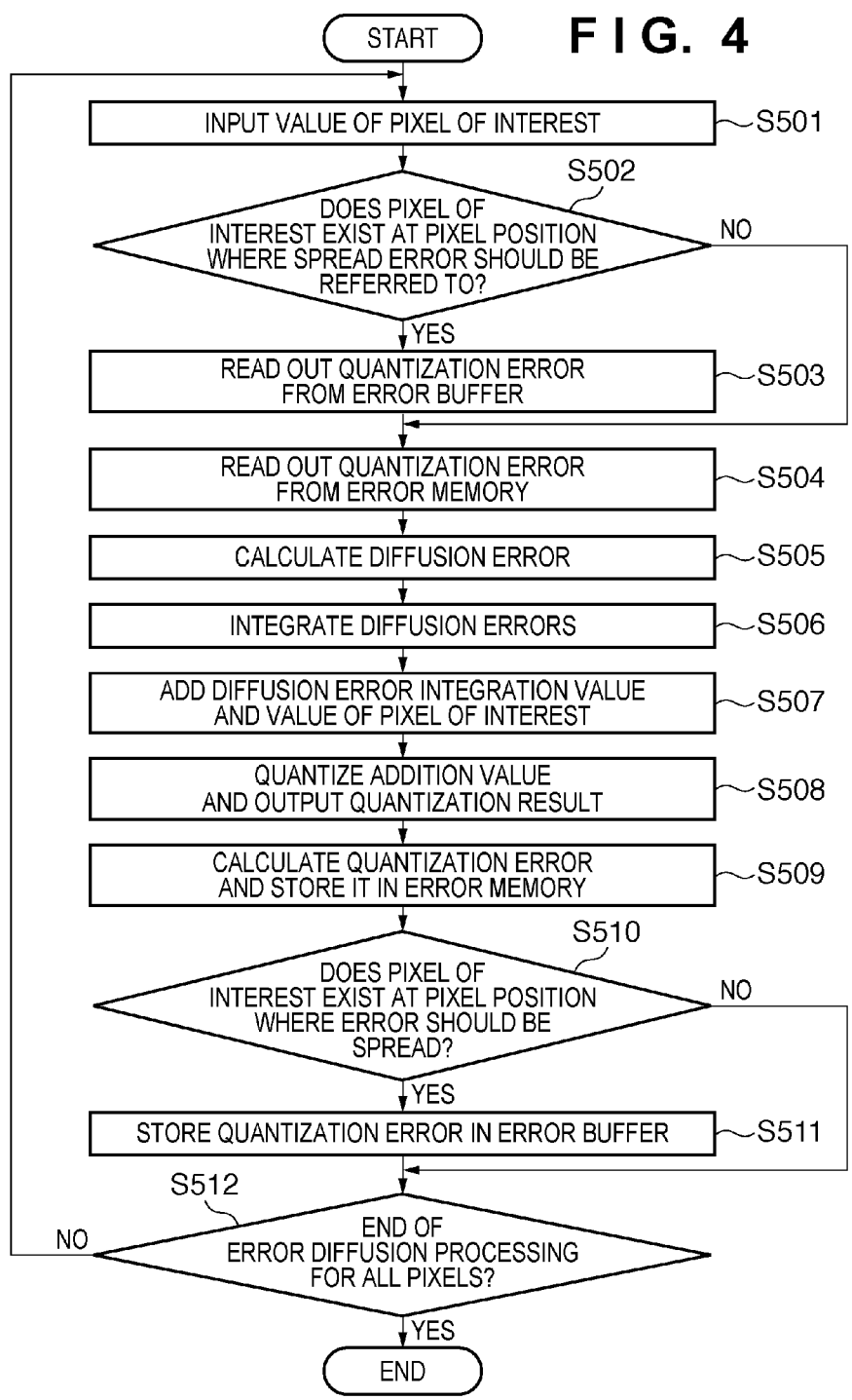

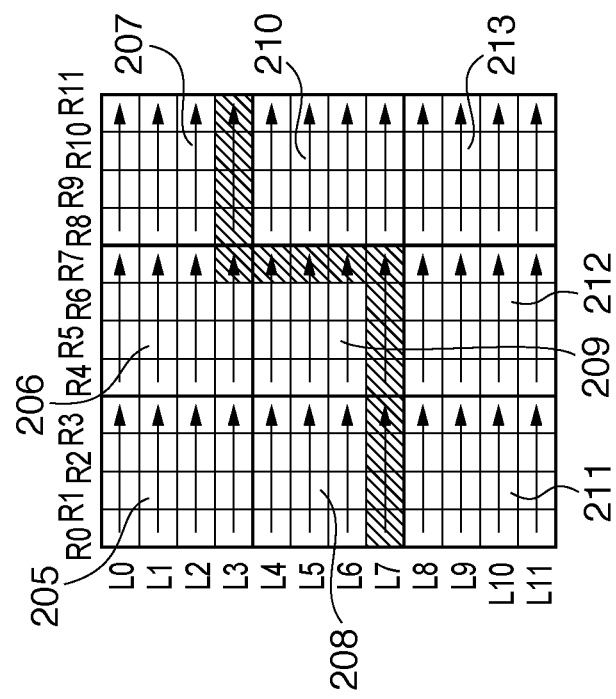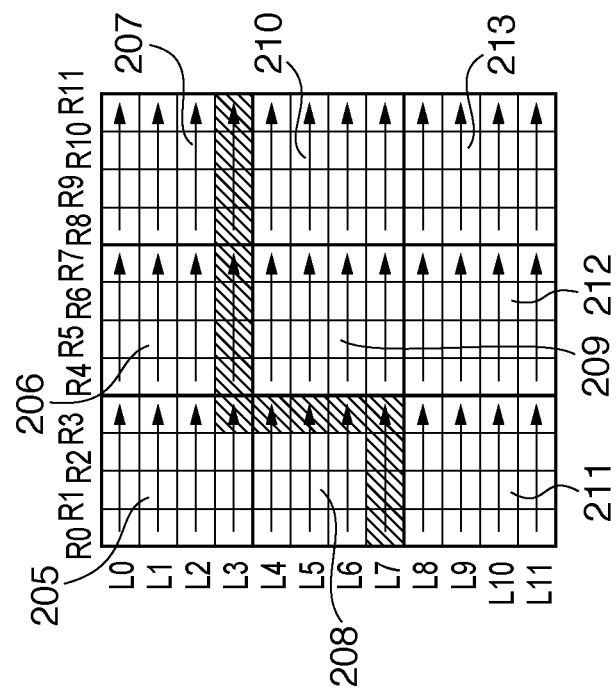

FIG. 10

| MODE | REGION DIVISION METHOD | | ERROR DIFFUSION MATRIX | |
|---|---|---|---|---|
| 0 | BAND DIVISION | L0 ...... L7 | [1 7 / 5 * / 3 ] ×1/16 | SPREAD PIXEL POSITION : L3<br>REFERENCE PIXEL POSITION : L4 |
| 1 | BAND DIVISION PRESENCE OF OVERLAPPING PROCESSING REGION | L0 ... L4 ... L7 | [1 7 / 5 * / 3 ] ×1/16 | SPREAD PIXEL POSITION : L2<br>REFERENCE PIXEL POSITION : L3 |
| 2 | BAND DIVISION | L0 ........ L9 | [1 3 5 / 3 5 7 / 5 7 * / 3 5 / 1 3] ×1/48 | SPREAD PIXEL POSITION : L3, L4<br>REFERENCE PIXEL POSITION : L5, L6 |
| 3 | TILE DIVISION | R0 ...... R12 / L0 ...... L12 | [1 5 3 / 7 *] ×1/16 | SPREAD PIXEL POSITION: L3, L7, R3, R7<br>REFERENCE POSITION: L4, L8, R4, R8 |
| ... | ... | | ... | ... |

IMAGE PROCESSING APPARATUS AND IMAGE PROCESSING METHOD FOR PERFORMING ERROR DIFFUSION PROCESSING FOR EACH REGION OF AN IMAGE

BACKGROUND OF THE INVENTION

1. Field of the Invention

The present invention relates to an image processing apparatus and image processing method and, more particularly, to an image processing apparatus and image processing method for performing error diffusion processing for an image.

2. Description of the Related Art

It is a common practice to process an image captured by a digital camera or the like and print the processed image. However, the printing apparatus can express a smaller number of tones per pixel than by the display apparatus. Pseudo-halftone processing is therefore required to reduce the number of tones of an image before printing and pseudo-expressing the original tonality. Pseudo-halftone processing is achieved by various methods. Among them, error diffusion processing is most popular because it can provide an image that satisfies both tonality and resolution. Error diffusion processing sequentially executes processing to diffuse the difference (quantization error) between the tone value of the pixel of interest and the quantization value of the pixel of interest to unprocessed pixels around the pixel of interest at predetermined ratios.

When processing image data, it needs to be developed in the memory. However, the cost rises if the device is equipped with a memory having a full-size storage capacity capable of developing all image data corresponding to one image. It is not practical to mount such a memory having a full-size storage capacity in a device which needs to be provided at low cost, like a home printer. Under the circumstances, an image is generally divided into a plurality of regions, and the regions are developed one by one in the memory and undergo image processing.

However, when error diffusion processing is done after region division, a dot pattern mismatch occurs at a joint where the error diffusion processing results of regions are connected. This is visually recognized as thread-like image degradation. This is because no error is diffused between regions, impairing the continuity of error diffusion processing at the joint.

Japanese Patent Publication No. 6-091606 (Japanese Patent Laid-Open No. 63-310269) discloses an invention which buffers a quantization error generated upon quantizing a pixel at the boundary of the region of interest in order to use it for error diffusion processing for a pixel at the boundary of a region to be processed next (to be referred to as the next region). Further, this literature discloses an invention which sets an overlapping region between the region of interest and the next region to approximate a quantization error to be diffused from a pixel at the boundary of the region of interest to one at the boundary of the next region.

In an invention disclosed in Japanese Patent No. 3004628, an image is divided into bands in the sub-scanning direction, and each band is further divided into slices in the main scanning direction. A quantization error generated in the final pixel of the slice is stored in the first memory, and a quantization error generated in each pixel is stored in the second memory. The first pixel of each slice is quantized by referring to quantization errors stored in the first and second memories. Another pixel is quantized by referring to only quantization errors stored in the second memory. Then, error diffusion processing is done. Error spread between bands using two memories which buffer quantization errors simultaneously achieves reduction of the storage capacity of the memory for developing an image and maintenance of the continuity of error diffusion processing at the band boundary.

The above-described conventional technique buffers a quantization error at the boundary of a region having undergone error diffusion processing (to be referred to as a previous region) before the region of interest. However, the continuity of error diffusion processing cannot always be maintained depending on the error diffusion processing method. For example, a quantization error itself may be buffered, or a diffusion error to be diffused to each pixel may be buffered. The diffusion error is a value obtained by multiplying the quantization error of the pixel of interest by a diffusion coefficient determined by the relationship between the pixel of interest and a pixel at the error diffusion destination (to be referred to as a diffusion destination pixel), and integrating the resultant values for each diffusion destination pixel. A method of storing an error in the buffer memory and a method of referring to an error stored in the buffer memory differ between these two cases. If the processing results of respective regions are connected without properly storing and referring to a buffered error (to be referred to as a spread error), a discontinuous dot pattern is generated at the joint.

In addition, a pixel whose quantization error is spread and a pixel to which a diffusion error is spread change depending on the region division manner such as whether to set an overlapping region or whether divided regions partially overlap each other. Note that divided regions partially overlap each other when an image is formed by superposing the dot patterns of adjacent divided regions. For example, even if an overlapping region is set and an error is spread from the boundary at the lower end of the region of interest to the next region, a discontinuous dot pattern may appear at the joint. This is because a portion where an error needs to be spread between regions does not coincide with the boundary at the lower end of the region of interest and the continuity of error diffusion processing is lost. When divided regions partially overlap each other, the lower end of the region of interest is not the boundary of the next region to which an error needs to be spread. Thus, no error can be appropriately spread, generating a discontinuous dot pattern at the joint.

SUMMARY OF THE INVENTION

The present invention in its first aspect, provides an image processing apparatus for performing error diffusion processing for each region of an image divided into a plurality of regions, comprising: a first error holding unit arranged to hold errors which occurred in the error diffusion processing for a region different from a region containing a pixel of interest in error diffusion processing; a second error holding unit arranged to hold an error which occurred in error diffusion processing for a pixel near the pixel of interest in the error diffusion processing for the region containing the pixel of interest; a first determining unit arranged to determine whether or not the pixel of interest exists at a first pixel position where it is necessary to reference the first error holding unit; a second determining unit arranged to determine whether or not the pixel of interest exists at a second pixel position where it is necessary to write in the first error holding unit; an obtaining unit arranged to obtain an error to be referred, wherein when the pixel of interest exists at the first pixel position, the error is obtained from at least the first error holding unit, and when the pixel of interest does not exist at the first pixel position, the error is obtained from the second error holding unit; a quantizing unit arranged to calculate an addition value from the error obtained by the obtaining unit and a value of the pixel of interest, and quantize the addition value to obtain a quantization value of the pixel of interest; a calculating unit arranged to calculate an error for the pixel of interest from the quantization value and the addition value; and a storing unit arranged to store the error for the pixel of interest, wherein when the pixel of interest does not exist at the second pixel position, the error for the pixel of interest is stored in the second error holding unit, and when the pixel of interest exists at the second pixel position, the error for the pixel of interest is stored in at least the first error holding unit.

The present invention in its second aspect, provides an image processing method of performing error diffusion processing for each region of an image divided into a plurality of regions, comprising the steps of: holding errors, which occurred in the error diffusion processing for a region different from a region containing a pixel of interest in error diffusion processing, in a first error holding unit; holding an error which occurred in error diffusion processing for a pixel near the pixel of interest in error diffusion processing for the region containing the pixel of interest in a second error holding unit; determining whether or not the pixel of interest exists at a first pixel position where it is necessary to reference the first error holding unit; determining whether or not the pixel interest exists at a second pixel position where it is necessary to write in the first error holding unit; obtaining an error to be referred, wherein when the pixel of interest exists at the first pixel position, the error is obtained from at least the first error holding unit, and when the pixel of interest does not exist at the first pixel position, the error is obtained from the second error holding unit; calculating an addition value from the error obtained in the obtaining step and a value of the pixel of interest, and quantizing the addition value to obtain a quantization value of the pixel of interest; calculating an error for the pixel of interest from the quantization value and the addition value; and storing the error for the pixel of interest, wherein when the pixel of interest does not exist at the second pixel position, the error for the pixel of interest is stored in the second error holding unit, and when the pixel of interest exists at the second pixel position, the error for the pixel of interest is stored in at least the first error holding unit.

According to these aspect, an error can be appropriately spread between regions when performing error diffusion processing for an image divided into a plurality of regions. This can prevent generation of a discontinuous dot pattern owing to poor continuity of error diffusion processing at the joint of a region.

Further features of the present invention will become apparent from the following description of exemplary embodiments with reference to the attached drawings.

BRIEF DESCRIPTION OF THE DRAWINGS

FIG. 1 is a block diagram for explaining the arrangement of an image processing apparatus applicable to the first embodiment.

FIGS. 2A to 2C are views for explaining an example of an image division method, a pixel scanning method in error diffusion processing, and an error diffusion matrix.

FIG. 4 is a flowchart for explaining processing by the error diffusion processing unit when spreading a quantization error.

FIGS. 9A and 9B are views for explaining an example of pixels whose quantization errors are stored in an error buffer.

FIG. 10 is a table for explaining an example of a region division method, an error diffusion matrix, a pixel position where an error should be referred to, and a pixel position where an error should be spread in accordance with an error diffusion processing mode settable by the user.

FIGS. 14A to 14C are views for explaining a pixel position where an error should be referred to.

DESCRIPTION OF THE EMBODIMENTS

Figure 3:
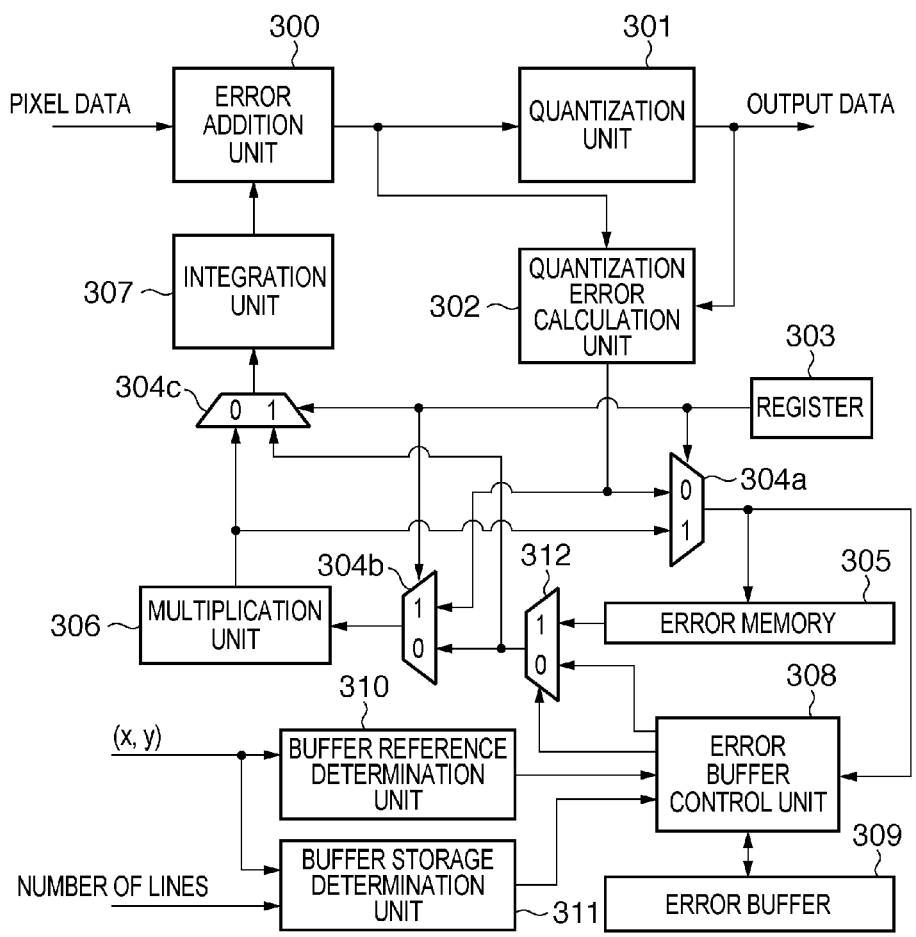
FIG. 3 is a block diagram for explaining the arrangement of an error diffusion processing unit.

An image processing apparatus and image processing method according to preferred embodiments of the present invention will now be described in detail with reference to the accompanying drawings.

First Embodiment

The first embodiment will describe an arrangement in which a quantization error or diffusion error can be selected as an error to be spread between bands when an image is divided into a plurality of bands and error diffusion processing is performed for each band.

[Apparatus Arrangement]

The arrangement of an image processing apparatus according to the first embodiment will be exemplified with reference to the block diagram of FIG. 1. An image input unit 100 is, for example, an image input device such as a scanner or digital camera, or an interface for inputting multi-valued image data from a recording device such as a hard disk drive. A region division unit 101 divides an image represented by input image data into a plurality of regions. An error diffusion processing unit 102 sequentially performs error diffusion processing for the respective regions divided by the region division unit 101, and generates image data reduced in the number of tones. When input image data is N-valued data (number of tones=N), image data having undergone error diffusion processing becomes M-valued data (number of tones M<N). An image output unit 103 is an interface which outputs image data having undergone error diffusion processing to an inkjet printing apparatus or printer engine. Note that the printing apparatus or printer engine prints, on printing paper, an image represented by image data having undergone error diffusion processing.

An example of an image division method, a pixel scanning method in error diffusion processing, and an error diffusion matrix will be explained with reference to FIGS. 2A to 2C. As shown in FIG. 2A, the region division unit 101 divides an input image 200 in the sub-scanning direction perpendicular to the main scanning direction. First, the error diffusion processing unit 102 scans pixels of a band 201 in a direction (downward or sub-scanning direction in FIG. 2A) perpendicular to the longitudinal direction (main scanning direction) of the band, and performs error diffusion processing using an error diffusion matrix shown in FIG. 2B or 2C. Then, the error diffusion processing unit 102 scans pixels in order of bands 202 and 203, and performs error diffusion processing using the error diffusion matrix shown in FIG. 2B or 2C. Note that the number of lines of each band is arbitrary as long as it is equal to or larger than the number of lines of the error diffusion matrix.

The error diffusion matrix shown in FIG. 2B indicates ratios (diffusion coefficients) at which the pixel of interest receives errors from neighboring pixels. More specifically, quantization errors are diffused to the pixel of interest indicated by "*" from a pixel on the upper line at a ratio of 7/16 and three adjacent pixels on an immediately preceding row at ratios of 1/16, 5/16, and 3/16 (from the top). The error diffusion matrix shown in FIG. 2C indicates ratios (diffusion coefficients) at which an error is diffused from the pixel of interest to neighboring pixels. More specifically, a quantization error is diffused from the pixel of interest indicated by "*" to a pixel on the lower line at a ratio of 7/16 and three adjacent pixels on an immediately succeeding row at ratios of 3/16, 5/16, and 1/16 (from the top). FIG. 2B shows an error diffusion matrix when viewed from a pixel which receives an error. FIG. 2C shows an error diffusion matrix when viewed from a pixel which diffuses an error. These two error diffusion matrices are identical.

[Error Diffusion Processing Unit]

The arrangement of the error diffusion processing unit 102 will be described with reference to the block diagram of FIG. 3. An error addition unit 300 adds the value of the pixel of interest of input image data and the cumulative value (diffusion error) of errors diffused from processed pixels near the pixel of interest that is output from an integration unit 307. A quantization unit 301 calculates a quantization value of the number of bits determined in advance from the value of the pixel of interest to which the diffusion error has been added. When image data is 8 bits, the quantization unit 301 executes binarization for the value (0 to 255) of the pixel of interest using, for example, a quantization threshold "127", and outputs a quantization value "0" or "255" as the value of the pixel of interest after quantization. A quantization error calculation unit 302 outputs, as a quantization error, the difference between the value of the pixel of interest to which the diffusion error has been added by the error addition unit 300, and the value of the pixel of interest having undergone quantization by the quantization unit 301. Processing by the quantization unit 301 is not limited to binarization, and may be ternarization, quanternarization, or quinarization. It suffices to reduce, for example, 8-bit image data having "256" tones into image data having the number of tones (for example, two, three, four, or five) processible by the image output unit 103.

A register 303 selects a spread error from a quantization error and diffusion error. In the register 303, "0" is set to select a quantization error as the spread error, and "1" is set to select a diffusion error as the spread error. Selectors 304a, 304b, and 304c select a data path between blocks based on a value set in the register 303.

A buffer reference determination unit 310 receives the position (x,y) of the pixel of interest in a band, and determines whether this position is a pixel position where a spread error determined by an error diffusion matrix used in a multiplication unit 306 should be referred to. When this position is a pixel position where a spread error should be referred to, the buffer reference determination unit 310 outputs position information indicating the position of an error to be read out from an error buffer 309.

A buffer storage determination unit 311 receives the position (x,y) of the pixel of interest in a band, and determines, based on the region division method (for example, the number of lines of a band), whether this position is a pixel position where an error determined by an error diffusion matrix used in the multiplication unit 306 should be spread. When this position is a pixel position where an error should be spread, the buffer storage determination unit 311 outputs position information indicating a position where an error is to be written in the error buffer 309. If the number of lines differs between bands, the buffer storage determination unit 311 receives the position (x,y) of the pixel of interest in a band, and the number of lines of the band of interest from the region division unit 101.

An error buffer control unit 308 receives the determination results and pieces of position information output from the buffer reference determination unit 310 and buffer storage determination unit 311. The error buffer control unit 308 controls read/write from/in the error buffer 309 and the path of a selector 312. More specifically, when the determination result of the buffer reference determination unit 310 indicates reference to a spread error, the error buffer control unit 308 obtains a spread error from the error buffer 309 in accordance with position information which is output from the buffer reference determination unit 310 and indicates a read position in the error buffer 309. The error buffer control unit 308 controls the selector 312 to input the spread error to the multiplication unit 306. When the determination result of the buffer reference determination unit 310 indicates non-reference to a spread error, the error buffer control unit 308 controls the selector 312 to input an error from an error memory 305 to the multiplication unit 306. When the determination result of the buffer storage determination unit 311 indicates storage of a spread error, the error buffer control unit 308 stores, in the error buffer 309, an error input via the selector 304a in accordance with position information which is output from the buffer storage determination unit 311 and indicates a write position in the error buffer 309.

The error memory 305 stores a quantization error from the quantization error calculation unit 302 via the selector 304a. Alternatively, the error memory 305 stores a diffusion error from the multiplication unit 306 via the selector 304a. The multiplication unit 306 calculates an error by multiplying an error input via the selector 304b by a diffusion coefficient. The integration unit 307 integrates errors input via the selector 304c to output an integrated error to be added to the value of the pixel of interest.

By setting the register 303, the error diffusion processing unit 102 can cope with both spread of a quantization error between bands and spread of a diffusion error. Note that the error diffusion processing unit 102 is not limited to the arrangement of FIG. 3 as long as it can properly spread an error between bands.

[Example of Error Diffusion Processing]

An example in which error diffusion processing is sequentially done for a plurality of bands obtained by dividing an image, as shown in FIG. 2A, will be explained. To implement error spread between regions, an error generated in a band having undergone error diffusion processing (to be referred to as a previous band) is buffered and spread to a band to undergo error diffusion processing next (to be referred to as the next band).

Case in which Quantization Error is Spread

Processing by the error diffusion processing unit 102 when spreading a quantization error will be explained with reference to the flowchart of FIG. 4.

The error diffusion processing unit 102 receives the value of the pixel of interest (step S501). The buffer reference determination unit 310 determines whether the pixel of interest exists at a pixel position where a spread error should be referred to (step S502). A pixel position where an error should be referred to and a pixel position where an error should be spread will be explained with reference to FIGS. 5A to 5F.

Figure 5C:
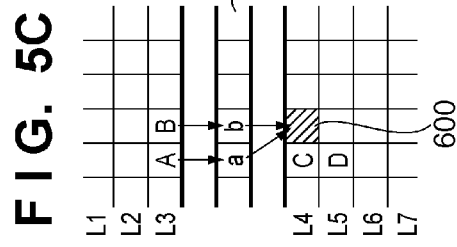
FIGS. 5A to 5F are views for explaining a pixel position where an error should be referred to and a pixel position where an error should be spread.
Figure 5F:
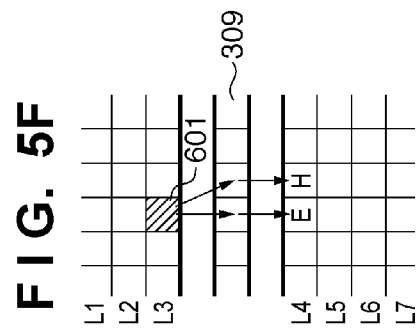
Figure 5B:
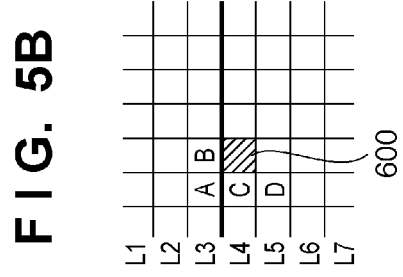
Figure 5E:
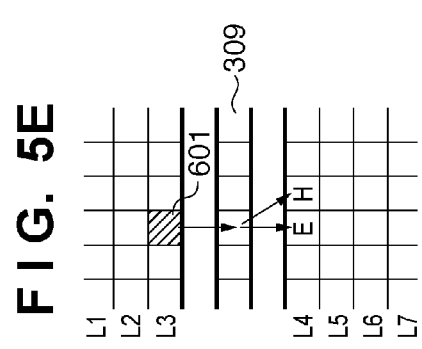
Figure 5A:
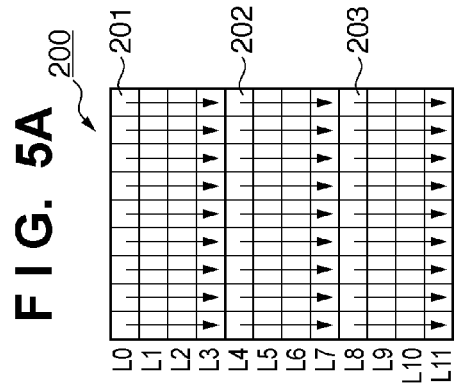

Assume that each band is formed from four lines, as shown in FIG. 5A. When processing a pixel 600 of interest on line L4 in the band 202, pixels (to be referred to as diffusion source pixels) which should spread errors to the pixel 600 of interest are four neighboring pixels A, B, C, and D shown in FIG. 5B. Diffusion source pixels A and B on line L3 belong not to the band 202 during processing (to be referred to as the band of interest) but to the band 201. Thus, quantization errors generated in error diffusion processing for a previous band are stored in the error buffer 309, and the quantization errors a and b of diffusion source pixels A and B are referred to in error diffusion processing for the pixel 600 of interest, as shown in FIG. 5C. Needless to say, error diffusion processing for pixels on line L4 needs to refer to the quantization errors of pixels on line L3 in the band 201, similar to the pixel 600 of interest.

In the use of the error diffusion matrix shown in FIG. 2B, pixel positions where spread errors should be referred to are pixel positions on the first line in the band of interest. When two or more diffusion source pixels exist above the pixel of interest in accordance with the shape of the error diffusion matrix, the error buffer 309 requires a storage capacity corresponding to a plurality of lines.

Two adjacent pixels on line L4 refer to a quantization error stored at the same position in the error buffer 309. For example, in FIG. 5C, pixel C and the pixel 600 of interest refer to the quantization error a stored in the error buffer 309. For example, a memory for delay in the error buffer control unit 308 holds the quantization error a referred to by the error buffer 309 during error diffusion processing for pixel C. When performing error diffusion processing for the pixel 600 of interest, the quantization error a held in the memory for delay is referred to. This can reduce the reference count of the error buffer 309 in error diffusion processing.

If the pixel of interest exists at a pixel position where a spread error should be referred to, the error buffer control unit 308 reads out a quantization error from the error buffer 309 based on position information output from the buffer reference determination unit 310, and supplies the position information and quantization error to the multiplication unit 306 (step S503). Then, the error buffer control unit 308 reads out the quantization error of a diffusion source pixel for the pixel of interest that is held in the error memory 305, and supplies the position information and quantization error of the diffusion source pixel to the multiplication unit 306 (step S504). The multiplication unit 306 multiplies the quantization error by a diffusion coefficient of the diffusion matrix shown in FIG. 2B that corresponds to the position information, and supplies the obtained diffusion error to the integration unit 307 (step S505). The integration unit 307 integrates diffusion errors sequentially input from the multiplication unit 306 (step S506). Note that the processes in steps S503 to S506 are repeated by the number of diffusion source pixels (four pixels in the example of FIG. 2B). After the end of integrating diffusion errors, the integration unit 307 outputs the integration result to the error addition unit 300.

The error addition unit 300 adds the diffusion error integration value input from the integration unit 307 and the value of the pixel of interest, and outputs the addition result to the quantization unit 301 (step S507). The quantization unit 301 quantizes the addition value input from the error addition unit 300, and outputs the quantization result (step S508). The quantization error calculation unit 302 subtracts, from the quantization result, the addition value output from the error addition unit 300 and stores the resultant quantization error at a position corresponding to the pixel position of the pixel of interest in the error memory 305 (step S509).

Figure 5D:
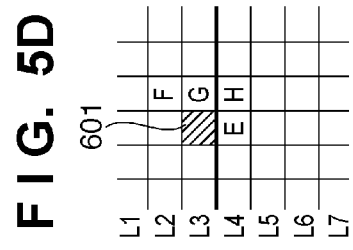

The buffer storage determination unit 311 determines whether the pixel of interest exists at a pixel position where an error should be spread (step S510). When processing a pixel 601 of interest on line L3 in the band 201, pixels (to be referred to as diffusion destination pixels) to which the quantization error of the pixel 601 of interest should be spread are four neighboring pixels E, F, G, and H, as shown in FIG. 5D. Diffusion destination pixels E and H on line L4 belong not to the band 201 of interest but to the band 202. Hence, a quantization error generated in error diffusion processing for the pixel 601 of interest is stored in the error buffer 309, and the quantization error of the pixel 601 of interest is referred to in error diffusion processing for the diffusion destination pixels E and H, as shown in FIG. 5E. As a matter of course, error diffusion processing for pixels on line L3 need to diffuse quantization errors to pixels on line L4 in the next band 202, similar to the pixel 601 of interest. In the use of the error diffusion matrix shown in FIG. 2C, pixel positions where errors should be spread are pixel positions on the final line in the band of interest.

If the pixel of interest exists at a pixel position where an error should be spread, the error buffer control unit 308 stores a quantization error output from the quantization error calculation unit 302 in the error buffer 309 based on position information output from the buffer storage determination unit 311 (step S511). The error diffusion processing unit 102 determines whether error diffusion processing has ended for all the pixels of the image input by the image input unit 100 (step S512). The processes in steps S501 to S511 are repeated till the end of error diffusion processing for all the pixels.

Case in which Diffusion Error is Spread

Figure 6:
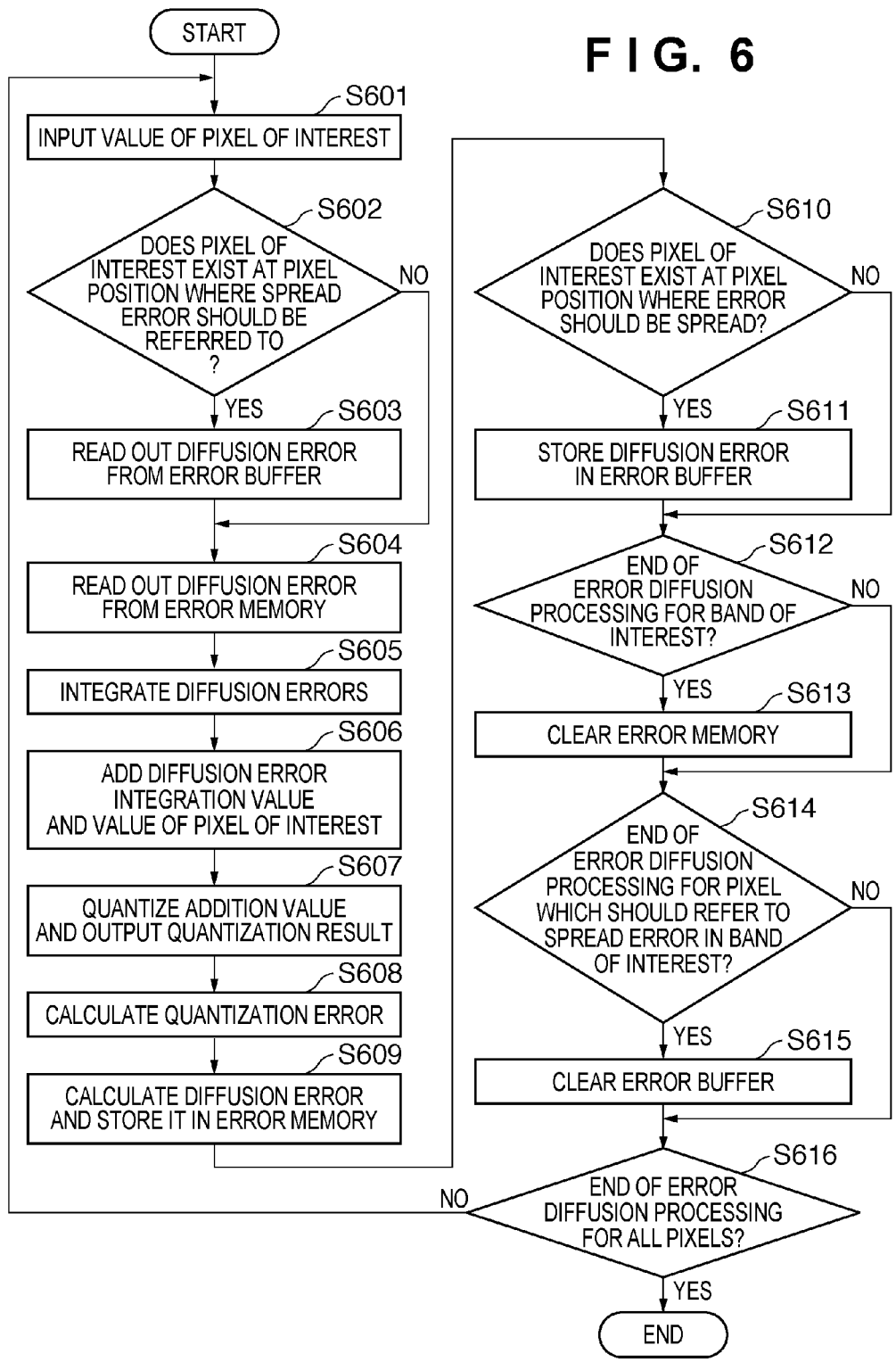
FIG. 6 is a flowchart for explaining processing by the error diffusion processing unit when spreading a diffusion error.

Processing by the error diffusion processing unit 102 when spreading a diffusion error will be explained with reference to the flowchart of FIG. 6.

The error diffusion processing unit 102 receives the value of the pixel of interest (step S601). The buffer reference determination unit 310 determines whether the pixel of interest exists at a pixel position where a spread error should be referred to (step S602). As described above, when processing the pixel 600 of interest on line L4 in the band 202, diffusion source pixels are four neighboring pixels A, B, C, and D shown in FIG. 5B. Pixels A and B belong not to the band 202 of interest but to the band 201. In the use of the error diffusion matrix shown in FIG. 2B, pixel positions where spread errors should be referred to are pixel positions on the first line in the band of interest. Note that the error buffer 309 stores the sum of diffusion errors diffused from diffusion source pixels to a diffusion destination pixel. In the example of FIG. 5B, the sum of a diffusion error from pixel A and a diffusion error from pixel B is stored at a position corresponding to the pixel 600 of interest in the error buffer 309. That is, a spread error stored in the error buffer 309 is independent of the shape of the error diffusion matrix.

If the pixel of interest exists at a pixel position where a spread error should be referred to, the error buffer control unit 308 reads out a diffusion error from the error buffer 309 based on position information (position information of the pixel of interest) output from the buffer reference determination unit 310, and supplies it to the integration unit 307 (step S603). Then, the error buffer control unit 308 reads out a diffusion error corresponding to the pixel of interest that is held in the error memory 305, and supplies it to the integration unit 307 (step S604).

The integration unit 307 integrates the diffusion errors input from the error buffer control unit 308, and outputs the integration result to the error addition unit 300 (step S605). The error addition unit 300 adds the diffusion error integration value input from the integration unit 307 and the value of the pixel of interest, and outputs the addition result to the quantization unit 301 (step S606). The quantization unit 301 quantizes the addition value input from the error addition unit 300, and outputs the quantization result (step S607). The quantization error calculation unit 302 calculates a quantization error by subtracting, from the quantization result, the addition value output from the error addition unit 300 (step S608). The multiplication unit 306 calculates a diffusion error by diffusing the quantization error of the pixel of interest in accordance with the error diffusion matrix shown in FIG. 2C, and stores the diffusion error at a position corresponding to the pixel position of the diffusion destination pixel in the error memory 305 (step S609). At this time, the multiplication unit 306 adds a diffusion error which has already been stored at a storage position, and a diffusion error to be newly stored at the storage position, integrating the diffusion errors.

The buffer storage determination unit 311 determines whether the pixel of interest exists at a pixel position where an error should be spread (step S610). As described above, when processing the pixel 601 of interest on line L3 in the band 201 shown in FIG. 5D, diffusion destination pixels of the quantization error of the pixel 601 of interest are four neighboring pixels E, F, G, and H. Diffusion destination pixels E and H on line L4 belong not to the band 201 of interest but to the band 202. Therefore, as shown in FIG. 5F, diffusion errors are calculated by multiplying a quantization error generated in error diffusion processing for the pixel 601 of interest by diffusion coefficients corresponding to diffusion destination pixels E and H. The diffusion errors are stored at positions corresponding to pixels E and H in the error buffer 309, and referred to in error diffusion processing for diffusion destination pixels E and H. Needless to say, error diffusion processing for pixels on line L3 needs to diffuse quantization errors to pixels on line L4 in the next band 202, similar to the pixel 601 of interest. In the use of the error diffusion matrix shown in FIG. 2C, pixel positions where errors should be spread are pixel positions on the final line in the band of interest.

The diffusion errors of two adjacent pixels on line L3 are diffused to the same pixel on line L4. For example, in FIG. 5D, the diffusion errors of the pixel 601 of interest and pixel G are diffused to pixel H. For example, the memory for delay in the error buffer control unit 308 holds diffusion errors to pixel H in error diffusion processing for the pixel 601 of interest. The sum of diffusion errors to pixel H in error diffusion processing for pixel G and diffusion errors held in the memory for delay is calculated. The calculated diffusion error is stored at a position corresponding to pixel H in the error buffer 309. This can reduce the write count of the error buffer 309 in error diffusion processing.

Depending on the shape of the error diffusion matrix, the band of interest may have two or more pixels out of diffusion destination pixels to which an error should be diffused from the pixel of interest. In this case, the error buffer 309 requires a storage capacity corresponding to a plurality of lines. For example, the error buffer 309 needs to store diffusion errors to be diffused from pixels on line L2 to those on line L4, and diffusion errors to be diffused from pixels on line L3 to those on lines L4 and L5. In this case, a plurality of diffusion errors to pixels on line L4 are integrated using the memory for delay in the error buffer control unit 308, and stored in the error buffer 309. In general error diffusion processing, errors spread to pixels other than adjacent ones are small, and errors diffused from pixels on line L2 to those on line L4 are negligibly small. In addition, the influence of errors spread to adjacent pixels is significant. The influence of errors diffused from pixels on line L3 to those on line L4 is greater than that of errors diffused from pixels on line L2 to those on line L4. That is, the continuity of error diffusion processing is maintained even if errors diffused from pixels on line L2 to those on line L4 are ignored. Considering this error diffusion characteristic, even the storage capacity of the error buffer 309 can be reduced to that for one line.

If the pixel of interest exists at a pixel position where an error should be spread, the error buffer control unit 308 stores, at a position corresponding to the pixel position of the diffusion destination pixel in the error buffer 309, a diffusion error which is output from the multiplication unit 306 and is to be diffused to the next band (step S611). At this time, the error buffer control unit 308 adds a diffusion error which has already been stored at a storage position, and a diffusion error to be newly stored at the storage position, integrating the diffusion errors.

Based on the determination result and position information from the buffer reference determination unit 310, the error buffer control unit 308 determines whether error diffusion processing has ended for the band of interest (step S612). Further, based on the determination result and position information from the buffer storage determination unit 311, the error buffer control unit 308 determines whether error diffusion processing has ended for pixels (pixels on the first line in the band of interest in this example) which should refer to spread errors in the band of interest (step S614). After the end of error diffusion processing for the band of interest, the error buffer control unit 308 clears the error memory 305 not to integrate diffusion errors of a previous band (step S613). If error diffusion processing has ended for pixels which should refer to spread errors in the band of interest, the error buffer control unit 308 clears the error buffer 309 not to integrate diffusion errors of the previous band (step S615).

The error diffusion processing unit 102 determines whether error diffusion processing has ended for all the pixels of the image input by the image input unit 100 (step S616). The processes in steps S601 to S615 are repeated till the end of error diffusion processing for all the pixels.

As described above, based on the position of the pixel of interest, the shape of the error diffusion matrix, and the region division method, the buffer reference determination unit 310 and buffer storage determination unit 311 determine whether the error buffer 309 needs to be accessed. If the error buffer 309 needs to be accessed, an access position in the error buffer 309 is calculated, and a diffusion error is read out from the error buffer 309 or stored in it.

In the above manner, the error buffer control unit 308 controls storage and reference of an error in the error buffer 309 in accordance with the determination result of whether the error buffer 309 needs to be accessed, thereby implementing error spread at an arbitrary spread position.

When a quantization error is selected as a spread error, no diffusion coefficient is multiplied, and the value stored in the error buffer 309 is an integer. However, the error buffer 309 requires a storage capacity corresponding to a plurality of lines depending on the shape of the error diffusion matrix. To the contrary, when a diffusion error is selected as a spread error, the error buffer 309 needs to store even the decimal part upon multiplication of the diffusion coefficient. However, the error buffer 309 suffices to have a storage capacity corresponding to one line regardless of the shape of the error diffusion matrix. More specifically, when positions where errors should be referred to or positions where errors should be spread belong to one line in accordance with the shape of the error diffusion matrix, the storage capacity of the error buffer 309 can be reduced by selecting a quantization error as a spread error. When positions where errors should be referred to or positions where errors should be spread belong to a plurality of lines, the storage capacity of the error buffer 309 can be reduced by selecting a diffusion error as a spread error. In the above-described arrangement, the storage capacity of the error buffer 309 can always be minimized.

Also, the circuit design can be optimized for the feature of the storage device if the error memory 305 is formed from a static random access memory (SRAM) with high access speed though the cost per storage capacity is high, and the error buffer 309 is formed from a dynamic random access memory (DRAM) at low cost per storage capacity though the access speed is low. For error diffusion processing within a divided region, the errors of neighboring pixels are always read out from the error memory 305 in processing the pixel of interest, and errors generated by the processing are always stored. To the contrary, the error buffer 309 is accessed at only an error spread position for performing error spread between divided regions, but requires as large storage capacity to hold all spread errors. For this reason, an SRAM is used for the error memory 305 which needs to be accessed quickly, and a low-cost DRAM is used for the error buffer 309 requiring a large storage capacity. This can implement a high-speed, low-cost processing circuit.

In the above description, the error buffer 309 serving as the first error holding unit and the error memory 305 serving as the second error holding unit are individual storage devices. However, two physically different storage devices need not be used as long as storage areas for two functions are ensured. When storage areas for the two functions are ensured in a single storage device, it suffices to sequentially store and refer to errors. Also when storage areas for the two functions are ensured across a plurality of storage areas or storage devices, the present invention can be implemented as long as errors can be properly stored and referred to.

In this fashion, when performing error diffusion processing for an image divided into a plurality of regions, a quantization error or diffusion error is stored in the error buffer 309 to appropriately spread the error between the regions. This can prevent generation of a discontinuous dot pattern owing to poor continuity of error diffusion processing at the joint of a region.

Second Embodiment

An image processing apparatus and image processing method according to the second embodiment of the present invention will be described. In the second embodiment, the same reference numerals as those in the first embodiment denote the same parts, and a detailed description thereof will not be repeated.

Figure 7A:
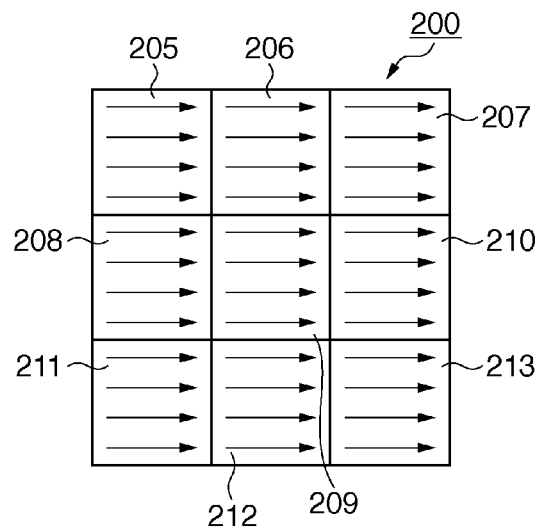
FIGS. 7A to 7C are views for explaining an example of an image division method, a pixel scanning method in error diffusion processing, and an error diffusion matrix in the second embodiment.
Figure 7B:
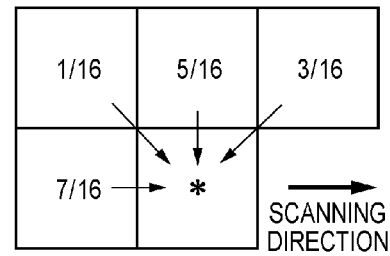
Figure 7C:
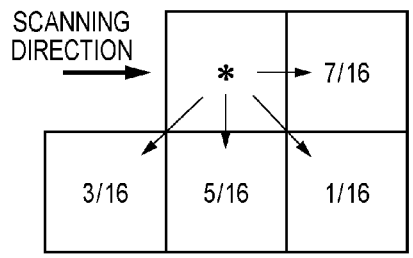

An example of an image division method, a pixel scanning method in error diffusion processing, and an error diffusion matrix in the second embodiment will be explained with reference to FIGS. 7A to 7C. In the first embodiment, error diffusion processing is performed by scanning each region obtained by dividing the elongated image 200 into bands, as shown in FIG. 2A. In the second embodiment, error diffusion processing is done using an error diffusion matrix shown in FIG. 7B or 7C by scanning, in order of regions 205, 206, ..., 213 in the lateral direction (main scanning direction), each region obtained by dividing an image 200 into tiles, as shown in FIG. 7A. FIG. 7B shows an error diffusion matrix when viewed from a diffusion destination pixel. FIG. 7C shows an error diffusion matrix when viewed from a diffusion source pixel. These two error diffusion matrices are identical.

Image processing in the second embodiment is the same as that in the first embodiment except for the region division method and pixel scanning direction. The arrangement of an image processing apparatus shown in FIG. 1, that of an error diffusion processing unit 102 shown in FIG. 3, and processing sequences shown in FIGS. 4 and 6 are the same as those in the first embodiment.

A diffusion destination pixel which refers to the error of a tile having undergone error diffusion processing (to be referred to as a previous processing tile), and a diffusion source pixel which spreads an error to a tile to undergo error diffusion processing (to be referred to as an un-processing tile) will be explained. A pixel position where an error should be referred to and a pixel position where an error should be spread will be explained with reference to FIGS. 8A to 8E.

Figure 8A:
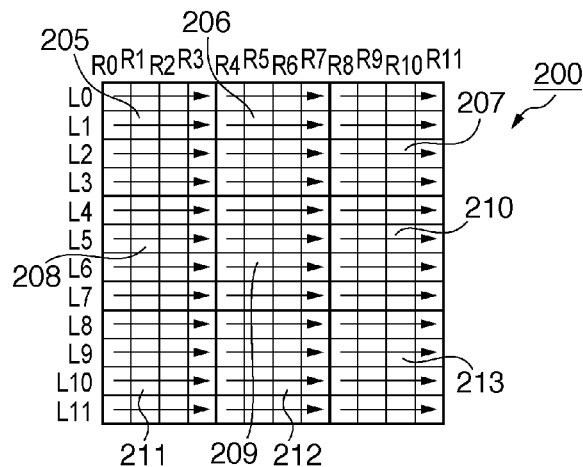
FIGS. 8A to 8E are views for explaining a pixel position where an error should be referred to and a pixel position where an error should be spread.
Figure 8B:
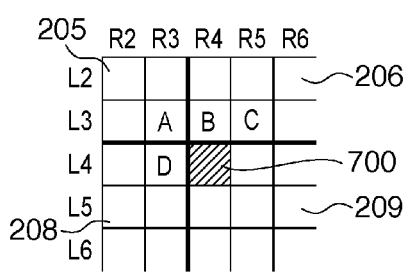
Figure 8C:
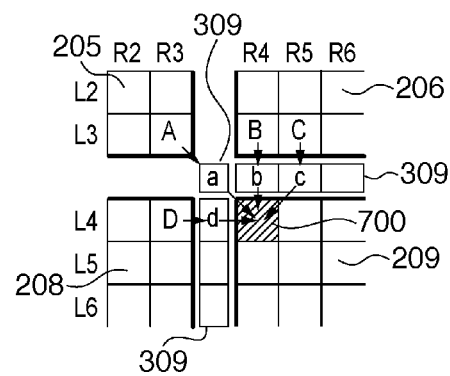

Assume that each tile is formed from 4×4 pixels, as shown in FIG. 8A. When processing a pixel 700 of interest in a tile 209 on line L4 and row R4, diffusion source pixels for the pixel 700 of interest are four neighboring pixels A, B, C, and D shown in FIG. 8B. Diffusion source pixel A belongs to a tile 205, diffusion source pixels B and C belong to a tile 206, and diffusion source pixel D belongs to a tile 208. Diffusion source pixels A, B, C, and D do not belong to the tile 209 during processing (to be referred to as the tile of interest). Hence, quantization errors generated in error diffusion processing for previous processing tiles are stored in an error buffer 309, as shown in FIG. 8C. FIG. 8C shows storage of quantization errors. A diffusion error is stored at a position corresponding to a diffusion destination pixel in the error buffer 309. Error diffusion processing for the pixel 700 of interest refers to the quantization errors a, b, c, and d (or diffusion errors) of diffusion source pixels A, B, C, and D. Needless to say, error diffusion processing for pixels on line L4 or row R4 in the tile 209 of interest need to refer to the errors of pixels on line L3 or row R3, similar to the pixel 700 of interest. In the use of the error diffusion matrix shown in FIG. 7B, pixel positions where a spread error should be referred to are pixel positions on the first line and first row of the tile of interest.

Figure 8D:
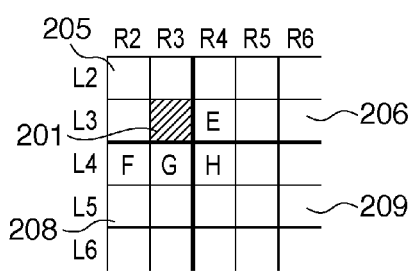
Figure 8E:
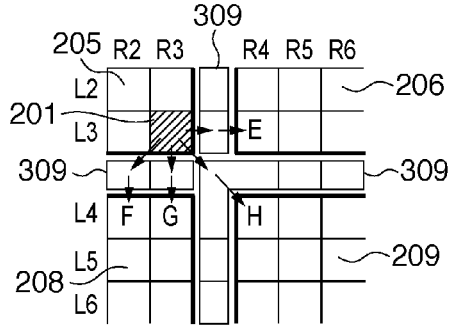

When processing a pixel 701 of interest on line L3 and row R3 in the tile 205, diffusion destination pixels for the pixel 701 of interest are four neighboring pixels E, F, G, and H, as shown in FIG. 8D. Diffusion destination pixel E belongs to the tile 206, diffusion destination pixels F and G belong to the tile 208, and diffusion destination pixel H belongs to the tile 209. A quantization error generated in error diffusion processing for the pixel 701 of interest is stored in the error buffer 309, as shown in FIG. 8E. FIG. 8E shows storage of quantization errors. A diffusion error is stored at a position corresponding to a diffusion destination pixel in the error buffer 309, as a matter of course. Error diffusion processing for diffusion destination pixels E, F, G, and H refers to the quantization error (or diffusion error) of the pixel 701 of interest. Error diffusion processing for pixels on line L3 or row R3 in the tile 205 of interest needs to diffuse errors to pixels on line L4 or row R4 in an un-processing tile, similar to the pixel 701 of interest. In the use of the error diffusion matrix shown in FIG. 7C, pixel positions where errors should be spread are pixel positions on the last line and last row of the tile of interest.

Pixels whose quantization errors are actually stored in the error buffer 309 are those on the final line of a previous processing tile and those on the final row of the previous processing tile at the boundary between the previous processing tile and an un-processing tile. An example of pixels whose quantization errors are stored in the error buffer 309 will be explained with reference to FIGS. 9A and 9B. Referring to FIG. 9A, the tiles 205 to 208 are previous processing tiles, and the tiles 209 to 213 are un-processing tiles. FIG. 9B shows a state immediately after the end of error diffusion processing for the tile 209 of interest. In this case, the tiles 205 to 209 are previous processing tiles, and the tiles 210 to 213 are un-processing tiles. The error buffer 309 stores the quantization errors of pixels in previous processing tiles at the boundary between the previous processing tiles and un-processing tiles. In other words, the error buffer 309 suffices to store the quantization errors of pixels (16 pixels in FIGS. 9A and 9B) at the boundary between previous processing tiles and un-processing tiles. When spreading diffusion errors, pixels for which the error buffer 309 actually stores diffusion errors are pixels on the first lines of un-processing tiles and those on the first rows of un-processing tiles at the boundary between previous processing tiles and un-processing tiles. Similar to spread of quantization errors, the error buffer 309 suffices to store diffusion errors for pixels at the boundary between previous processing tiles and un-processing tiles.

In this way, even if the region division method changes and the positions of diffusion source pixels or diffusion destination pixels change, it suffices to spread quantization errors or diffusion errors for pixels at the boundaries between regions having undergone error diffusion processing and regions to undergo error diffusion processing. This can be implemented by determining by a buffer reference determination unit 310 and buffer storage determination unit 311 whether to access the error buffer 309, and controlling access to the error buffer 309 and an error memory 305 by an error buffer control unit 308. Even if the region division method changes while the arrangement of the error diffusion processing unit 102 remains unchanged from that in the first embodiment, the continuity of error diffusion processing can be maintained by error spread between regions at proper positions.

Third Embodiment

An image processing apparatus and image processing method according to the third embodiment of the present invention will be described. In the third embodiment, the same reference numerals as those in the first and second embodiments denote the same parts, and a detailed description thereof will not be repeated.

It is known that a larger error reference range improves the image quality of a processing result in error diffusion processing. However, a larger error reference range increases the calculation load for processing one pixel, and decreases the processing speed. It is desirable to balance the permissible image quality and the permissible processing speed by adjusting or selecting the error reference range. The third embodiment will explain error diffusion processing capable of setting again the region division method and the shape of the error diffusion matrix (error reference range) in accordance with user settings.

[Error Diffusion Processing Mode]

An example of a region division method, an error diffusion matrix, a pixel position where an error should be referred to, and a pixel position where an error should be spread in accordance with an error diffusion processing mode settable by the user will be explained with reference to FIG. 10. For example, in mode 0, an image is divided into bands as in the first embodiment, and the error diffusion matrix shown in FIG. 2B is used. When one band is formed from four lines, a pixel position (to be referred to as a reference pixel position) where an error should be referred to is line L4, and a pixel position (to be referred to as a spread pixel position) where an error should be spread is line L3.

In mode 1, error diffusion processing is done simultaneously for two final lines of a band to be processed first and two first lines (lines L3 and L4 when one band is formed from five lines) of a band to be processed next. In this case, the reference pixel position is line L3, and the spread pixel position is line L2.

In mode 2, error diffusion processing is performed using a larger error diffusion matrix than in mode 0 that is obtained by widening the error reference range by one line at each of the top and bottom and by one row on the left side. When one band is formed from five lines, the reference pixel position is line L5, L6, and the spread pixel position is line L3, L4.

In mode 3, an image is divided into tiles as in the second embodiment, and the error diffusion matrix shown in FIG. 7B is used. When one tile is formed from 4×4 pixels, the reference pixel positions are lines L4 and L8 and rows R4 and R8, and the spread pixel positions are lines L3 and L7 and rows R3 and R7.

In addition to the modes shown in FIG. 10, a mode using a different number of lines of a band, one using a different number of pixels of a tile, and one using a different error diffusion coefficient are settable.

[Error Diffusion Processing Unit]

The arrangement of an error diffusion processing unit 102 in the third embodiment will be described with reference to the block diagram of FIG. 11.

A setting unit 800 includes a table for storing setting information corresponding to each mode shown in FIG. 10. In accordance with a mode selected by the user, the setting unit 800 sets the region division method of a region division unit 101 and an error diffusion matrix for use by a multiplication unit 306. According to the mode, the setting unit 800 writes data indicating a reference pixel position in a register 801, and data indicating a spread pixel position in a register 802.

A buffer reference determination unit 310 compares the position (x,y) of the pixel of interest in a band or tile with a reference pixel position written in the register 801, and determines whether the pixel of interest exists at a pixel position where an error should be referred to. Similarly, a buffer storage determination unit 311 compares the position (x,y) of the pixel of interest in a band or tile with a spread pixel position written in the register 802, and determines whether the pixel of interest exists at a pixel position where an error should be spread.

When there is an overlapping processing region, like mode 1, it is also possible to control not to output all quantization results from the error diffusion processing unit 102. More specifically, the quantization result of the overlapping processing region is output in error diffusion processing for the vicinity of the final line of a band, and is not output in error diffusion processing for the vicinity of the first line of a band. It is also possible not to output the quantization result of the overlapping processing region in error diffusion processing for the vicinity of the final line of a band but to output it in error diffusion processing for the vicinity of the first line of a band. The error buffer control unit 308 controls an output unit 803 based on information about an overlapping processing region that is input from the setting unit 800, and position information of the pixel of interest that is input from the buffer reference determination unit 310 or buffer storage determination unit 311. Note that the information about an overlapping processing region is, for example, the number of lines of a band or that of lines of an overlapping processing region. Under the control of the error buffer control unit 308, the output unit 803 switches whether or not to output a quantization result.

Figure 11:
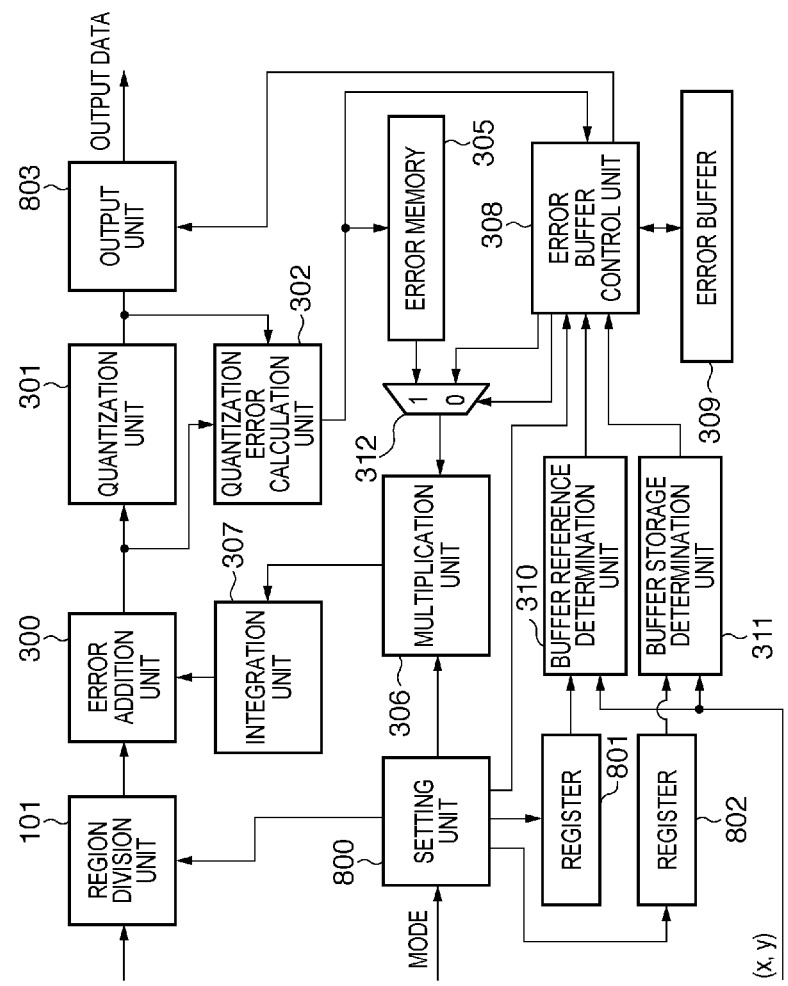
FIG. 11 is a block diagram for explaining the arrangement of an error diffusion processing unit in the third embodiment.

FIG. 11 does not illustrate a register 303 and selectors 304a, 304b, and 304c for descriptive convenience, and shows an arrangement when spreading a quantization error, for illustrative convenience. In practice, spread of a quantization error and spread of a diffusion error can be switched by the register 303 and the selectors 304a, 304b, and 304c. Further, spread of a quantization error and spread of a diffusion error can be switched by setting the value of the register 303 by the setting unit 800, including, in a mode, switching between spread of a quantization error and spread of a diffusion error.

[Processing in Presence of Overlapping Processing Region]

Error diffusion processing when there is an overlapping processing region, like mode 1, will be explained.

Figure 12:
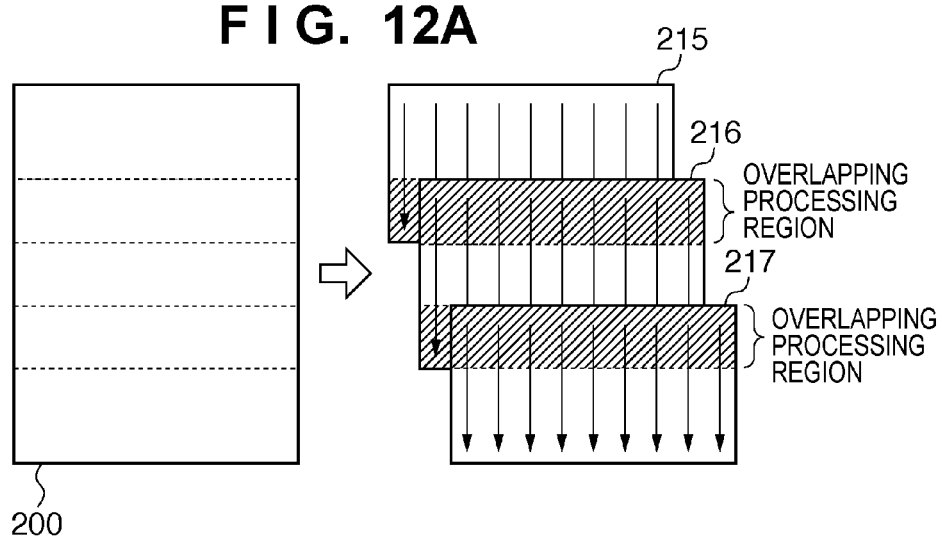
FIGS. 12A to 12C are views for explaining an example of an image division method, a pixel scanning method in error diffusion processing, and an error diffusion matrix.

An example of an image division method, a pixel scanning method in error diffusion processing, and an error diffusion matrix will be explained with reference to FIGS. 12A to 12C. As shown in FIG. 12A, the region division unit 101 divides an input image 200 into bands so that each band has an overlapping processing region. First, the error diffusion processing unit 102 scans pixels of a band 215 in a direction (downward in FIG. 12A) perpendicular to the longitudinal direction of the band, and performs error diffusion processing using an error diffusion matrix shown in FIG. 12B or 12C. Then, the error diffusion processing unit 102 scans pixels in order of bands 216 and 217, and performs error diffusion processing using the error diffusion matrix shown in FIG. 12B or 12C. Note that the error diffusion matrices shown in FIGS. 2B and 2C are also usable.

FIG. 12B shows ratios (diffusion coefficients) at which the pixel of interest receives errors from neighboring pixels. More specifically, quantization errors are diffused to the pixel of interest indicated by "*" from a pixel on an immediately upper line at a ratio of 7/48 and a pixel on the second upper line at a ratio of 5/48. In addition, quantization errors are diffused from five pixels on an immediately preceding row at ratios of 3/48, 5/48, 7/48, 5/48, and 3/48 (from the top). Quantization errors are further diffused from five pixels on the second preceding row at ratios of 1/48, 3/48, 5/48, 3/48, and 1/48 (from the top).

FIG. 12C shows ratios (diffusion coefficients) at which an error is diffused from the pixel of interest to neighboring pixels. More specifically, a quantization error is diffused from the pixel of interest indicated by "*" to a pixel on an immediately lower line at a ratio of 7/48 and a pixel on the second lower line at a ratio of 5/48. Also, the quantization error is diffused to five pixels on an immediately succeeding row at ratios of 3/48, 5/48, 7/48, 5/48, and 3/48 (from the top). The quantization error is further diffused to five pixels on the second succeeding row at ratios of 1/48, 3/48, 5/48, 3/48, and 1/48 (from the top). FIG. 12B shows an error diffusion matrix when viewed from a pixel which receives an error. FIG. 12C shows an error diffusion matrix when viewed from a pixel which diffuses an error. These two error diffusion matrices are identical.

Figure 13:
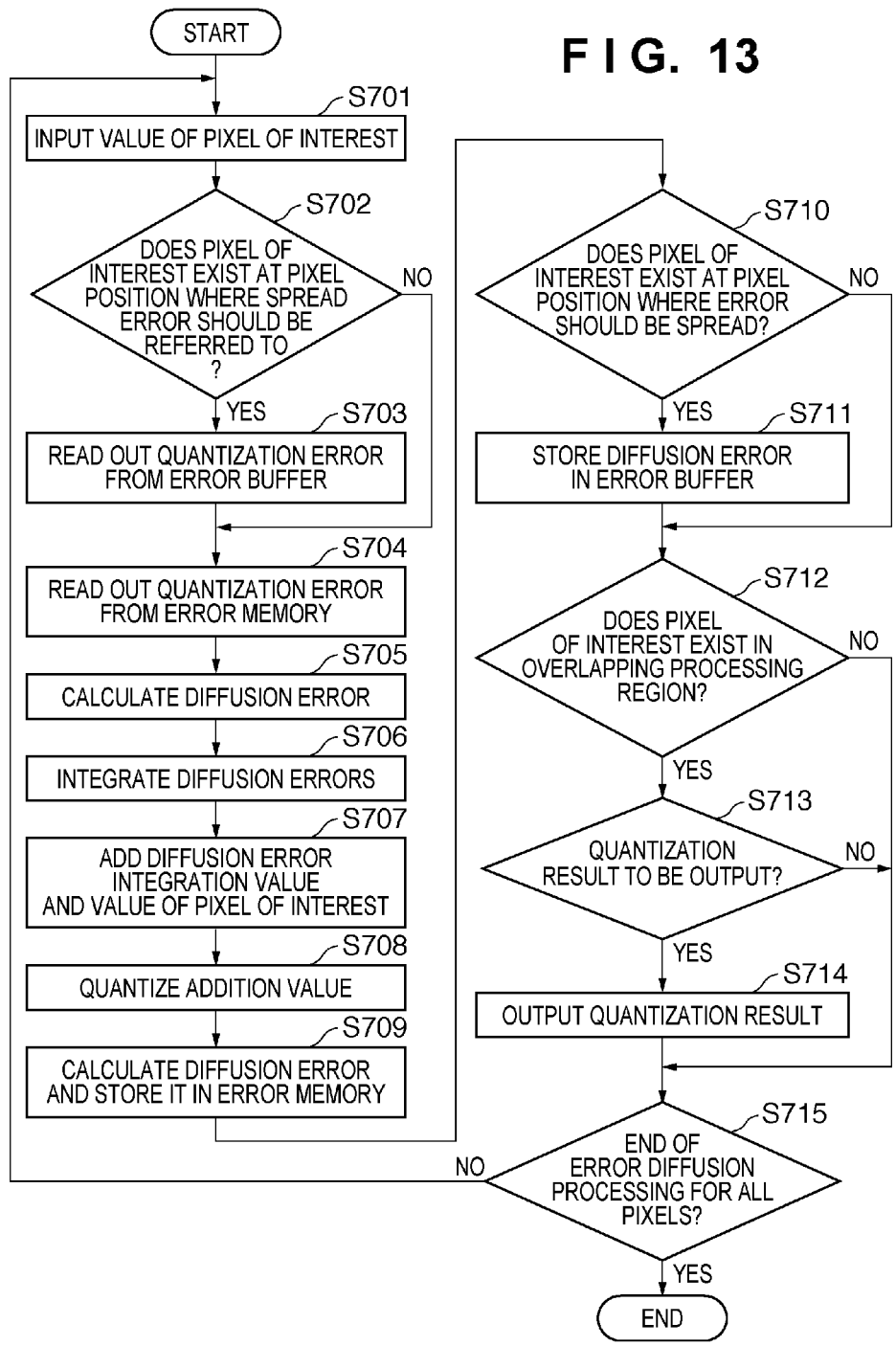
FIG. 13 is a flowchart for explaining error diffusion processing when there is an overlapping processing region and a quantization error is to be spread.

Error diffusion processing when there is an overlapping processing region and a quantization error is to be spread will be explained with reference to the flowchart of FIG. 13. Assume that a mode has been selected and the setting unit 800 has made settings corresponding to the mode.

The error diffusion processing unit 102 receives the value of the pixel of interest (step S701). The buffer reference determination unit 310 determines whether the pixel of interest exists at a reference pixel position (step S702). A pixel position where an error should be referred to will be explained with reference to FIGS. 14A to 14C.

Figure 14A:
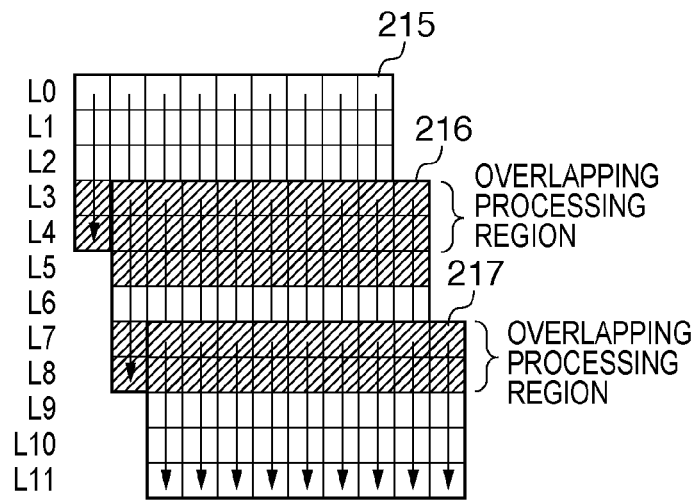
Figure 14B:
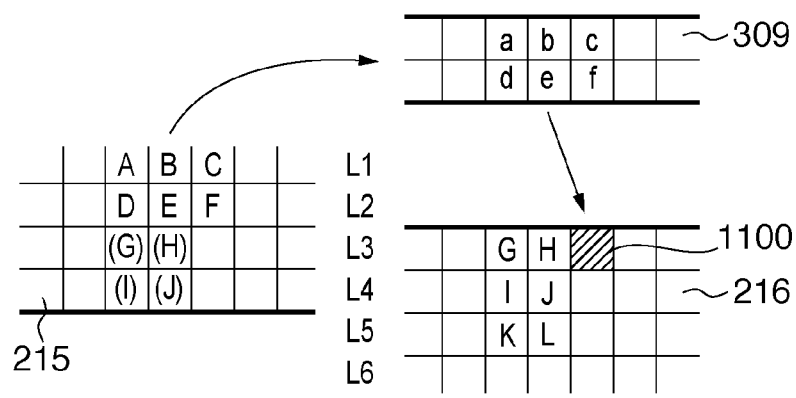

Assume that each band is formed from five lines including two lines of an overlapping processing region, as shown in FIG. 14A. When processing a pixel 1100 of interest on line L3 in the band 216, diffusion source pixels for the pixel 1100 of interest are 12 neighboring pixels A to L shown in FIG. 14B. Six pixels, that is, diffusion source pixels A, B, and C on line L1 and diffusion source pixels D, E, and F on line L2 belong not to the band 216 of interest but to the band 215. During processing of the band 216 of interest, an error memory 305 stores only quantization errors generated in diffusion source pixels G to L and does not store quantization errors generated in diffusion source pixels A to F. Hence, quantization errors generated in error diffusion processing for a previous band are stored in the error buffer 309, and error diffusion processing for the pixel 1100 of interest refers to the quantization errors a to f of diffusion source pixels A to F, as shown in FIG. 14B.

Figure 14C:
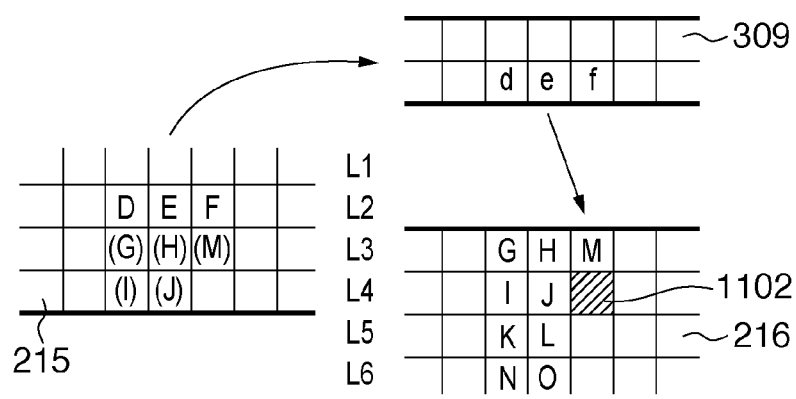

When processing a pixel 1102 of interest on line L4 in the band 216, diffusion source pixels for the pixel 1102 of interest are 12 neighboring pixels D to O shown in FIG. 14C. Three diffusion source pixels D, E, and F on line L2 belong not to the band 216 of interest but to the band 215. During processing of the band 216 of interest, the error memory 305 stores only quantization errors generated in diffusion source pixels G to O and does not store quantization errors generated in diffusion source pixels D to F. As shown in FIG. 14C, the quantization errors d to f of diffusion source pixels D to F that are stored in the error buffer 309 are referred to in error diffusion processing for the pixel 1102 of interest.

In this fashion, error diffusion processing for pixels on line L3 needs to refer to the quantization errors of pixels on lines L1 and L2 in the previous band 215, similar to the pixel 1100 of interest. Also, error diffusion processing for pixels on line L4 needs to refer to the quantization errors of pixels on line L2 in the previous band 215, similar to the pixel 1102 of interest.

As the quantization errors of diffusion source pixels G, H, I, J, and M, quantization errors stored in the error memory 305 are referred to in error diffusion processing for the band 216. It is also possible to store the quantization errors of diffusion source pixels G, H, I, J, and M in the error buffer 309 in error diffusion processing for the band 215, and refer to the quantization errors of diffusion source pixels G, H, I, J, and M stored in the error buffer 309 in error diffusion processing for the band 216. In the use of the error diffusion matrix shown in FIG. 12B, pixel positions where spread errors should be referred to are pixel positions on the first and second lines in the band of interest.

If the pixel of interest exists at a reference pixel position, the error buffer control unit 308 reads out a quantization error from the error buffer 309 based on position information output from the buffer reference determination unit 310, and supplies the position information and quantization error to the multiplication unit 306 (step S703). Then, the error buffer control unit 308 reads out the quantization error of a diffusion source pixel for the pixel of interest that is held in the error memory 305, and supplies the position information and quantization error of the diffusion source pixel to the multiplication unit 306 (step S704). The multiplication unit 306 multiplies the quantization error by a diffusion coefficient of the diffusion matrix shown in FIG. 12B that corresponds to the position information, and supplies the obtained diffusion error to an integration unit 307 (step S705). The integration unit 307 integrates diffusion errors sequentially input from the multiplication unit 306 (step S706). Note that the processes in steps S703 to S706 are repeated by the number of diffusion source pixels (12 pixels in the example of FIG. 12B). After the end of integrating diffusion errors, the integration unit 307 outputs the integration result to an error addition unit 300.

The error addition unit 300 adds the diffusion error integration value input from the integration unit 307 and the value of the pixel of interest, and outputs the addition result to a quantization unit 301 (step S707). The quantization unit 301 quantizes the addition value input from the error addition unit 300 (step S708). A quantization error calculation unit 302 subtracts, from the quantization result, the addition value output from the error addition unit 300 and stores the resultant quantization error at a position corresponding to the pixel position of the pixel of interest in the error memory 305 (step S709).

The buffer storage determination unit 311 determines whether the pixel of interest exists at a spread pixel position (step S710). When the error diffusion matrix shown in FIG. 12C is used and the band 215 is the band of interest, pixels on lines L1 and L2 are those from which errors should be spread. That is, pixel positions where errors should be spread are pixel positions on the final line of the non-overlapping region of the band of interest and a line above it.

If the pixel of interest exists at a spread pixel position, the error buffer control unit 308 stores a quantization error output from the quantization error calculation unit 302 in the error buffer 309 based on position information output from the buffer storage determination unit 311 (step S711). The error buffer control unit 308 determines whether the pixel of interest exists in the overlapping processing region (step S712). If the pixel of interest exists in the overlapping processing region, the error buffer control unit 308 determines whether to output the quantization result (step S713). If the error buffer control unit 308 determines to output the quantization result, it controls the output unit 803 to output the quantization result (step S714). The error diffusion processing unit 102 determines whether error diffusion processing has ended for all the pixels of the image input by the image input unit 100 (step S715).

The processes in steps S701 to S714 are repeated till the end of error diffusion processing for all the pixels.

As described above, the reference pixel position in the presence of an overlapping processing region starts from the first line of a region, similar to that in the absence of an overlapping processing region. However, the spread pixel position in the present of an overlapping processing region does not end on the final line of a region but ends on the final line of the non-overlapping region of the region. This spread pixel position is a pixel position for which no quantization error exists in the error memory 305 in processing of the next band. Hence, when there is an overlapping processing region, a quantization error to be stored in the error buffer 309 cannot be determined by only a pixel position within the band of interest. The embodiment has exemplified a case in which an arbitrary position in the buffer storage determination unit 311 is determined as a spread pixel position based on a spread pixel position written in the register 802 and the position of the pixel of interest in accordance with a mode selected by the user. To maintain the continuity of error diffusion processing, a spread pixel position to be set in the register 802 is desirably determined based on the region division method and the shape of the error diffusion matrix. Even an arrangement in which the buffer storage determination unit 311 receives these pieces of information to determine a spread pixel position can also achieve appropriate error spread.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-188756, filed Aug. 25, 2010 and 2011-143392, filed Jun. 28, 2011, which are hereby incorporated by reference herein in their entirety.

What is claimed is:

1. An image processing apparatus for performing error diffusion processing for each region of an image divided into a plurality of regions so that each region has an overlapping processing region, comprising:
   a first error holding unit constructed to hold quantization errors which occurred in the error diffusion processing for a region different from a region of interest containing a pixel of interest;
   a second error holding unit constructed to hold quantization errors which occurred in the error diffusion processing for a pixel near the pixel of interest in the region of interest;
   a first determining unit constructed to determine whether or not the pixel of interest exists at a first pixel position where it is necessary to reference the first error holding unit based on a position of the pixel of interest in the region of interest and an error diffusion matrix to be used in quantization;
   a second determining unit constructed to determine whether or not the pixel of interest exists at a second pixel position where it is necessary to write in the first error holding unit based on the position of the pixel of interest in the region of interest, the error diffusion matrix, and a position of the overlapping processing region in the region of interest;
   an obtaining unit constructed to obtain errors to be referred, wherein when the pixel of interest exists at the first pixel position, the errors are obtained from both the first and second error holding units, and when the pixel of interest does not exist at the first pixel position, the errors are obtained from only the second error holding unit;
   a quantizing unit constructed to calculate an addition value from a diffusion error and a value of the pixel of interest, and quantize the addition value to obtain a quantization value of the pixel of interest, wherein the diffusion error is calculated from the errors obtained by the obtaining unit using the error diffusion matrix;
   a calculating unit constructed to calculate a quantization error for the pixel of interest from the quantization value and the addition value; and
   a storing unit constructed to store the quantization error for the pixel of interest, wherein when the pixel of interest does not exist at the second pixel position, the quantization error for the pixel of interest is stored in only the second error holding unit, and when the pixel of interest exists at the second pixel position, the quantization error for the pixel of interest is stored in both the first and second error holding units.

2. The apparatus according to claim 1, wherein when the pixel of interest exists at a pixel position where a quantization error is to be spread to a region to undergo the error diffusion processing, the second determining unit determines that the pixel of interest exists at the second pixel position.

3. The apparatus according to claim 1, wherein the first determining unit is further constructed to supply information indicating a read position in the first error holding unit to the obtaining unit, and the second determining unit is further constructed to supply information indicating a write position in the first error holding unit to the storing unit, in accordance with the position of the pixel of interest in the region of interest.

4. The apparatus according to claim 1, wherein when the pixel of interest exists at a pixel position to touch a region which underwent the error diffusion processing, the first determining unit determines that the pixel of interest exists at the first pixel position, and when the pixel of interest exists at a pixel position to touch a region to undergo the error diffusion processing, the second determining unit determines that the pixel of interest exists at the second pixel position.

5. The apparatus according to claim 1, wherein the first error holding unit and the second error holding unit are individual storage devices.

6. The apparatus according to claim 1, wherein the first error holding unit and the second error holding unit correspond to different storage areas in a single storage device.

7. The apparatus according to claim 1, wherein the first error holding unit is formed from a dynamic random access memory, and the second error holding unit is formed from a static random access memory.

8. The apparatus according to claim 1, further comprising:
a setting unit constructed to set the first and second determining units in accordance with a mode selected from a plurality of modes by a user; and
a dividing unit constructed to divide the image into the plurality of regions in accordance with the selected mode.

9. The apparatus according to claim 8, wherein the plurality of modes comprise a first mode and a second mode, and a size of each of the plurality of regions when the first mode is selected is different from a size of each of the plurality of regions when the second mode is selected.

10. The apparatus according to claim 8, wherein the plurality of modes comprise a mode to make a dividing unit divide the image so that each of the plurality of regions has no overlapping processing region.

11. The apparatus according to claim 8, wherein the plurality of modes comprise a first mode and a second mode, and an error diffusion matrix to be used in the quantization when the first mode is selected is different from an error diffusion matrix to be used in the quantization when the second mode is selected.

12. An image processing method of performing error diffusion processing for each region of an image divided into a plurality of regions so that each region has an overlapping processing region, comprising the steps of:
Holding, in first holding unit, quantization errors, which occurred in the error diffusion processing for a region different from a region of interest containing a pixel of interest;
holding, in a second holding unit, quantization errors which occurred in the error diffusion processing for a pixel near the pixel of interest in the region of interest;
a first determination of determining whether or not the pixel of interest exists at a first pixel position where it is necessary to reference the first error holding unit based on a position of the pixel of interest in the region of interest and an error diffusion matrix to be used in quantization;
a second determination of determining whether or not the pixel interest exists at a second pixel position where it is necessary to write in the first error holding unit based on the position of the pixel of interest in the region of interest, the error diffusion matrix, and a position of the overlapping processing region in the region of interest;
obtaining errors to be referred, wherein when the pixel of interest exists at the first pixel position, the errors are obtained from both the first and second error holding units, and when the pixel of interest does not exist at the first pixel position, the errors are obtained from only the second error holding unit;
calculating an addition value from a diffusion error and a value of the pixel of interest, and quantizing the addition value to obtain a quantization value of the pixel of interest, wherein the diffusion error is calculated from the errors obtained in the obtaining step using the error diffusion matrix;
calculating a quantization error for the pixel of interest from the quantization value and the addition value; and
storing the quantization error for the pixel of interest, wherein when the pixel of interest does not exist at the second pixel position, the quantization error for the pixel of interest is stored in only the second error holding unit, and when the pixel of interest exists at the second pixel position, the quantization error for the pixel of interest is stored in both the first and second error holding units.

13. A non-transitory computer-readable medium storing a computer-executable program for causing a computer to carry out the method according to claim 12.

14. An image processing apparatus for performing error diffusion processing for each region of an image divided into a plurality of regions so that each region has an overlapping processing region, comprising:
a first error holding unit constructed to hold a diffusion error to be diffused to a pixel of interest and calculated from at least one error which occurred in the error diffusion processing for a region different from a region of interest containing the pixel of interest;
a second error holding unit constructed to hold a diffusion error to be diffused to the pixel of interest and calculated from at least one error which occurred in the error diffusion processing for at least one pixel near the pixel of interest in the region of interest;
a first determining unit constructed to determine whether or not the pixel of interest exists at a first pixel position where it is necessary to reference the first error holding unit based on a position of the pixel of interest in the region of interest;
a second determining unit constructed to determine whether or not the pixel of interest exists at a second pixel position where it is necessary to write in the first error holding unit based on the position of the pixel of interest in the region of interest, and a position of the overlapping processing region in the region of interest;
an obtaining unit constructed to obtain at least one diffusion error to be referred, wherein when the pixel of interest exists at the first pixel position, diffusion errors are obtained from both the first and second error holding units, and when the pixel of interest does not exist at the first pixel position, a diffusion error is obtained from only the second error holding unit;

a quantizing unit constructed to calculate an addition value from the at least one diffusion error obtained by the obtaining unit and a value of the pixel of interest, and quantize the addition value to obtain a quantization value of the pixel of interest;

a calculating unit constructed to calculate diffusion errors, which are diffused from the pixel of interest to pixels near the pixel of interest, from a difference between the quantization value and the addition value using an error diffusion matrix; and a storing unit constructed to store the diffusion errors diffused from the pixel of interest, wherein when the pixel of interest does not exist at the second pixel position, the diffusion errors diffused from the pixel of interest are stored in only the second error holding unit, and when the pixel of interest exists at the second pixel position, the diffusion errors diffused from the pixel of interest are stored in both the first and second error holding units.

* * * * *